US009692262B2

(12) United States Patent
Bradley et al.

(10) Patent No.: US 9,692,262 B2
(45) Date of Patent: Jun. 27, 2017

(54) SUSPENSION STRUCTURES

(75) Inventors: Stuart Ian Bradley, Leicestershire (GB); Graham Derek Le Flem, Warwickshire (GB)

(73) Assignee: GE Energy Power Conversion Technology Limited (GB)

( * ) Notice: Subject to any disclaimer, the term of this patent is extended or adjusted under 35 U.S.C. 154(b) by 494 days.

(21) Appl. No.: 13/379,838

(22) PCT Filed: Jun. 21, 2010

(86) PCT No.: PCT/EP2010/003734
§ 371 (c)(1),
(2), (4) Date: Mar. 2, 2012

(87) PCT Pub. No.: WO2010/149327
PCT Pub. Date: Dec. 29, 2010

(65) Prior Publication Data
US 2012/0169156 A1    Jul. 5, 2012

(30) Foreign Application Priority Data

Jun. 24, 2009  (EP) .................................... 09008234

(51) Int. Cl.
*H02K 5/24* (2006.01)
*H02K 1/18* (2006.01)
(52) U.S. Cl.
CPC .............. *H02K 1/185* (2013.01); *H02K 5/24* (2013.01)
(58) Field of Classification Search
CPC ................................. H02K 1/185; H02K 5/24
(Continued)

(56) References Cited

U.S. PATENT DOCUMENTS 1,845,551 A * 2/1932 Mitzi ....................... H02K 5/24
                                                              248/568
4,604,541 A * 8/1986 Murasato ................ H02K 3/16
                                                              310/180
(Continued)

FOREIGN PATENT DOCUMENTS

| CN | 1249558 A | 4/2000 |
| CN | 1792016 A | 6/2006 |
| JP | 6108698 A | 4/1994 |

OTHER PUBLICATIONS

Unofficial English translation of CN Office Action issued May 6, 2014 in connection with corresponding CN Patent Application No. 201080028207.X.

*Primary Examiner* — John K Kim
(74) *Attorney, Agent, or Firm* — Wood IP LLC

(57) ABSTRACT

A support structure is used to mount the stator of a rotating electrical machine (e.g. a motor or generator). The support structure includes a rigid external support frame (6). To minimise the transmission of vibrations caused by stator electromagnetic forces into the external support frame (6), at least one sandwich anti-vibration mount (14*a*) is secured between the external support frame (6) and a part of the stator (28). The mount (14*a*) is oriented relative to the stator such that it experiences compression loading in a substantially tangential direction of the stator and radial shear loading in a substantially radial direction of the stator during operation of the rotating electrical machine. The sandwich anti-vibration mount (14*a*, 14*b*) is pre-loaded with a pre-determined compression load substantially along its compression axis (Ac). The mount (14*a*) has a high stiffness characteristic Kc for compression loading and a stiffness characteristic Krs for radial shear loading that is substantially zero, or even negative. The mount (14*a*) will therefore (Continued)

restrain tangential deflection of the stator while still achieving a low-stiffness suspension in the radial direction.

14 Claims, 6 Drawing Sheets

(58) Field of Classification Search
USPC .............................. 310/51, 89, 91, 216.114
IPC ....................................................... H02K 5/24
See application file for complete search history.

(56) References Cited

U.S. PATENT DOCUMENTS

| | | | |
|---|---|---|---|
| 6,028,379 | A | 2/2000 | Bertolini et al. |
| 6,107,705 | A * | 8/2000 | Durantay ................ F03D 9/002 310/51 |
| 6,191,511 | B1 | 2/2001 | Zysset |
| 6,198,193 | B1 * | 3/2001 | Kappauf ................ H02K 3/505 29/596 |
| 6,777,851 | B2 | 8/2004 | Maslov |
| 2009/0058203 | A1 * | 3/2009 | Pettitt ................ F04D 25/0606 310/51 |
| 2011/0254390 | A1 * | 10/2011 | Crankshaw ............ H02K 1/185 310/51 |
| 2012/0169156 | A1 * | 7/2012 | Bradley et al. ................ 310/51 |

* cited by examiner

SUSPENSION STRUCTURES

FIELD OF THE INVENTION

The invention relates to suspension structures, and in particular to structures for supporting the stator of a rotating electrical machine such as a motor or generator.

BACKGROUND OF INVENTION

A stator assembly for a rotating electrical machine will normally be mounted to an external support frame. The magnetostrictive forces acting on the stator assembly cause modes of vibration in the radial direction (sometimes called "stator electromagnetic forces") which can result in large forces being transferred into the support frame. These vibrations in turn cause the support frame to emit noise. In many circumstances, it is desirable to minimise the level of noise that is emitted by the stator assembly. For instance, cruise ships may want to travel into environmentally sensitive areas, and environmental research vessels, fisheries research vessels or naval vessels etc. may want to minimise noise at all times.

The amount of vibration transferred into the support structure can be minimised by decoupling the stator assembly from the support structure using springs. However, existing designs of support structure that use springs are often inefficient, complex, expensive to manufacture and difficult to fit.

There is therefore a need for an improved support structure.

Sandwich anti-vibration mounts are well known for industrial applications. For example, they can be located underneath diesel engines or generator sets to provide a resilient suspension. A typical sandwich mount consists of one or more elastomeric layers formed from rubber or polymer located between two rigid end plates. In some cases, a rigid plate is interleaved between adjacent elastomeric layers for increased loading capability. Sandwich mounts can be used either in compression or shear, or a combination of both. U.S. Pat. No. 6,107,705 discloses a support structure for the stator of a rotating electrical machine where the attachment elements that are mounted between attachment points of an external support frame and the stator are sandwich mounts.

SUMMARY OF THE INVENTION

The present invention provides an improved support structure for the stator of a rotating electrical machine comprising:
an external support frame; and
at least one sandwich anti-vibration mount located between the external support frame and a part of the stator such that it experiences compression loading in a substantially tangential direction of the stator and radial shear loading in a substantially radial direction of the stator during operation of the rotating electrical machine;
wherein the sandwich anti-vibration mount has a stiffness characteristic for compression loading Kc and a stiffness characteristic for radial shear loading Krs; and
wherein the sandwich anti-vibration mount is pre-loaded with a predetermined compression load substantially along its compression axis such that the stiffness characteristic for radial shear loading Krs is substantially zero or negative.

The sandwich anti-vibration mount will have a compression axis along which a component of compression loading is applied, and a pair of orthogonal shear axes. A component of shear loading may be applied to the sandwich anti-vibration mount along one or both of the shear axes depending on the overall design of the support structure. In the case where the sandwich anti-vibration mount consists of a plurality of elastomeric layers interleaved with rigid plates then the compression axis will typically be substantially normal to the plane of the various elastomeric layers and interleaved rigid plates and the shear axes will typically be substantially parallel to the plane of the various elastomeric layers and interleaved rigid plates.

The sandwich anti-vibration mount will preferably be located such that its compression axis is aligned substantially with a tangent of the stator and one of its shear axes is aligned substantially with a radius of the stator, optionally with the geometric centre of the stator. The shear axis that is aligned substantially with a radius of the stator may be referred to as the radial shear axis and a component of radial shear loading will be applied to the sandwich anti-vibration mount along it.

In the case where the support structure includes two or more sandwich anti-vibration mounts then a respective one of their shear axes is preferably aligned substantially with a radius of the stator, optionally with the geometric centre of the stator. This will include the case where the or each mounting location includes a pair of co-located sandwich anti-vibration mounts as discussed in more detail below. In other words, where the pair of co-located sandwich anti-vibration mounts are circumferentially spaced apart then their respective radial shear axes will not be parallel but will each be preferably aligned with a radius of the stator.

The stator is preferably indirectly connected to the external support frame by at least one sandwich anti-vibration mount at a plurality of spaced mounting locations around the stator circumference. The mounting locations may be evenly or unevenly spaced around the stator circumference depending on the design of the electrical machine and/or the support structure. In a typical support structure the stator may be secured to the external support frame at two, three or four spaced mounting locations, each of which has at least one sandwich anti-vibration mount.

The sandwich anti-vibration mount has a stiffness characteristic Kc for compression loading and a stiffness characteristic Krs for radial shear loading and where the stiffness ratio of Kc:Krs is greater than or equal to about 16:1. The stiffness ratio can be considered to be infinity if Krs is zero or negative. FIG. 1 shows how the natural frequency ratio of the sandwich anti-vibration mount (torsional:radial) varies with the stiffness ratio. The lower limit of the natural frequency is about 4 and this is normally dictated by the ratio of the stator diameter and length and hence the mounting positions that are available for the sandwich anti-vibration mount. (For example, it has been found to be difficult to provide a workable suspension for a stator having a very short length (about 300 mm) and a large diameter (about 1500 mm) because the compression stiffness is too low to contain the torque and keep the radial natural frequency high enough to give stability without resorting to unfeasibly large mount designs.) For a natural frequency ratio greater than about 4 then it can be seen from FIG. 1 that the stiffness ratio of Kc:Krs is greater than or equal to about 16:1. This particular stiffness ratio therefore represents a practical minimum for most stator designs.

The sandwich anti-vibration mount will restrain tangential deflection of the stator while still achieving a low-stiffness suspension in the radial direction. In other words, the sandwich anti-vibration mount will not restrain radial deflection of the stator to any practical extent, thereby minimising the transfer of forces from the stator into the external support frame.

The compression load that is applied to the sandwich anti-vibration mount during operation of the electrical machine will normally be a combination of static compression loads that are substantially constant and dynamic compression loads that are variable. The combination of any static compression loads will effectively provide a steady-state compression load that is applied to the sandwich anti-vibration throughout its operating lifetime. Dynamic compression loads may then result in the total compression load that is applied to the sandwich anti-vibration mount at any particular time being greater or less than the steady-state compression load for the reasons described in more detail below. Any increase in the applied compression load beyond the steady-state compression load further compresses the elastomeric layers of the sandwich anti-vibration mount so that the rigid end support members move closer together. In the case where the applied compression load is less than the steady-state compression load then the elastomeric layers are uncompressed and the rigid end support members move further apart. During operation of the electrical machine, the rigid end support members of the sandwich anti-vibration mount therefore move closer together and further apart about a steady-state position that is determined by the combination of any static compression loads.

The sandwich anti-vibration mount is pre-loaded with a predetermined compression load. Any additional compression loads that might be applied to the sandwich anti-vibration mount will preferably not exceed about 60% of the pre-load. In other words, the pre-load Fp will generally be the dominant compression load that is applied to the sandwich anti-vibration mount throughout its operating lifetime. The pre-load is a static compression load and may be applied by any suitable mechanical means such as a through bolt or a shaped bracket, for example. The pre-load is applied along the compression axis of the sandwich anti-vibration mount. The application of the pre-load compresses the elastomeric layers of the sandwich anti-vibration mount and causes the rigid end support members to move closer together. Pre-loading the sandwich anti-vibration mount extends its service life by not allowing it to go through zero stress under normal operating conditions and generally increases the compression stiffness characteristic Kc. This means that deflections of the stator due to torque, shock etc. are reduced. Pre-loading also means that the performance of the sandwich anti-vibration mount is made substantially independent of the stator mass so that a standard sandwich anti-vibration mount can be used for any particular stator. This leads to a modular design of sandwich anti-vibration mount that is cost-effective to manufacture and is simple and easy to install to any stator support or frame.

Pre-loading the sandwich anti-vibration mount also helps to reduce the radial shear stiffness characteristic Krs as a result of the Euler buckling effect. In other words, the radial shear stiffness characteristic Krs will reduce according to the amount of compression loading until it is substantially zero, or even negative, as the mount becomes unstable. Therefore, a sandwich anti-vibration mount having regressive radial shear stiffness characteristics versus compression loading, and hence an instability in the radial shear direction, provides significantly better vibration isolation. The physical design of the sandwich anti-vibration mount may play a part in achieving the desired radial shear stiffness characteristics (as described below) but since the pre-load is the dominant compression load that is applied to the mount during its operating lifetime then it is typically the amount of pre-load that is selected to provide a radial shear stiffness characteristic Krs that is substantially zero or negative. Such a radial shear stiffness characteristic is normally actively avoided for conventional sandwich anti-vibration mounts, e.g. of the type that are designed to be located underneath diesel engines or generator sets to provide a resilient suspension, because of the inherent instability that is known to arise. Excessive pre-load is also normally actively avoided because it can lead to problems such as creep, settlement and misalignment. In the case of the present invention, the instability that comes from having a radial shear stiffness characteristic Krs that is close to zero or negative is deliberately exploited to minimise the transfer of vibrations between the stator and the external support frame.

FIG. 2A shows typical linear and non-linear compression stiffness curves for a sandwich anti-vibration mount. The stiffness curves represent how a sandwich anti-vibration mount is deflected in response to an applied compression load for the cases where the mount has linear and non-linear characteristics. FIG. 2B shows how the radial shear stiffness characteristic Krs changes when a sandwich anti-vibration mount is deflected in response to an applied compression load. In this case the mount is assumed to have a linear characteristic. Two radial shear stiffness characteristics are shown—one for a mount with two interleaved rigid plates and one for a mount with four interleaved rigid plates. For a deflection of 0.01 mm resulting from an applied compression load of 10 kN, a sandwich anti-vibration mount having four interleaved rigid plates will have a shear stiffness characteristic Krs of 60.6 kN/mm and a mount having two interleaved rigid plates will have a shear stiffness characteristic Krs of 88.4 kN/mm. It is important to note that the radial shear stiffness characteristic Krs decreases with an increasing compression stiffness characteristic Kc, and in some cases may become negative. Increasing the number of interleaved rigid plates will normally also have the effect of decreasing the radial shear stiffness characteristic Krs for any given compression deflection. FIGS. 2A and 2B are included solely for the purposes of illustrating the relationship between the stiffness characteristics of a typical sandwich anti-vibration mount and should be considered as limiting the present invention to any particular design, arrangement or stiffness characteristic ranges.

Depending on its mounting location, an additional static compression load may be applied to the sandwich anti-vibration mount in the form of a mass-load Fm. In other words, a component of the downward force of gravity acting on the stator may be applied to the sandwich anti-vibration mount along its compression axis. The combination of the pre-load and the mass-load will together provide a total static compression load that represents the steady-state compression load that is applied to the sandwich anti-vibration mount if the overall support structure remains stationary and the electrical machine is not operating.

The sandwich anti-vibration mount will normally also experience a dynamic compression load as a result of the torque generated by the electrical machine during its operation. The torque acts along a tangent of the stator and a component of the torque will normally be applied to the sandwich anti-vibration mount along its compression axis. The torque-load Ft will only be applied in one tangential direction of the stator if the rotor of the electrical machine always rotates in the same direction. In this case, the or each mounting location where the stator is secured to the external support frame only needs to include a single sandwich anti-vibration mount that will experience the additional compression loading due to torque when the electrical machine is operating; it being really appreciated that a pair of sandwich vibration mounts may still be required in some circumstances to accept other compression loads. If the rotor of the electrical machine can rotate in both opposite directions (e.g. for a marine propulsion motor that might need to rotate a propeller shaft in both directions to provide forward and reverse propulsion) then the or each mounting location will preferably include a pair of sandwich anti-vibration mounts, one that experiences a torque-load Ft when the rotor of the electrical machine rotates in one direction and another that experiences a torque-load when the rotor of the electrical machine rotates in the opposite direction. It will be readily appreciated that when the total compression load applied to one of the pair of sandwich anti-vibration mounts is greater than the steady-state compression load as a result of the additional torque-load Ft then the total compression load simultaneously applied to the other sandwich anti-vibration mount is less than the steady-state compression load. In other words, the elastomeric layers of one of the pair of sandwich anti-vibration mounts are further compressed by a certain amount while the elastomeric layers of the other sandwich anti-vibration are uncompressed by a certain amount.

The pair of sandwich anti-vibration mounts are preferably co-located at the or each mounting location. However, it would also be possible for the support structure to include one or more mounting locations with a sandwich anti-vibration mount that experiences an increased compression load due to torque when the rotor of the electrical machine rotates in one direction and one or more mounting locations with a sandwich anti-vibration mount that experiences an increased compression load due to torque when the rotor of the electrical rotates in the opposite direction. In other words, instead of the pair of sandwich anti-vibration mounts being co-located they would be located at different mounting locations spaced around the stator circumference.

The pair of sandwich anti-vibration mounts may have the same or different construction, including their stiffness characteristics Kc and Krs. For example, for a marine propulsion motor the sandwich anti-vibration mount that will experience an increased compression load when the rotor rotates in a direction to provide forward propulsion may be designed to accept higher compression loads than the sandwich anti-vibration mount that will experience an increased compression load when the rotor rotates in an opposite direction to provide reverse propulsion; it being readily appreciated that the torque-load Ft applied during forward propulsion will typically be greater than the torque-load applied during reverse propulsion.

Further dynamic compression loads (e.g. shock-loads Fs) may be applied to the sandwich anti-vibration mount as a result of unexpected shocks caused by rail shunts or seaway movement, for example.

In general terms, the total compression load Fc applied to the sandwich anti-vibration mount at any particular time may be represented by the following equation:

$$Fc = \underbrace{Fp + Fm}_{\text{static loads}} + \underbrace{Ft + Fs}_{\text{dynamic loads}}$$

The torque load Ft will be a positive (+ve) or negative (−ve) value depending on the direction in which the rotor is rotating and whether this results in an increased or decreased compression loading being applied to the sandwich anti-vibration mount. In practice, even if the torque load Ft is negative then the sandwich anti-vibration mount will continue to experience compression loading as a result of the pre-load Fp and the application of a negative torque load will simply result in a reduction in the total compression load Fc that the mount experiences.

The radial shear load applied to the sandwich anti-vibration mount at any particular time will depend on the radial deflection of the stator as a result of stator electromagnetic forces, and possibly also a component of any shock-load Fs.

Typical compression loads that might be experienced by a suitable sandwich anti-vibration mount are given for two electrical machine examples. None of the values given in the various Tables below should be considered as limiting the present invention to any particular design or arrangement.

A first electrical machine Ex1 is intended to represent a physically large machine that might, for example, be suitable as a marine propulsion motor and has the following design parameters:

TABLE 1

| Ex 1 | |
|---|---|
| Power rating: | 5 MW |
| Rpm: | 3600 |
| Mass: | 14000 kg |
| Stator diameter: | 1.4 m |

A second electrical machine Ex2 is intended to represent a physically small machine and has the following design parameters:

TABLE 2

| Ex 2 | |
|---|---|
| Power rating: | 150 kW |
| Rpm: | 1800 |
| Mass: | 220 kg |
| Stator diameter: | 0.28 m |

Typical compression loads that might be experienced by the sandwich anti-vibration mount when installed in a support structure for the stator of electrical machines Ex1 and Ex2 would be:

TABLE 3

| Typical compression loads for Ex 1 and Ex 2 | | |
|---|---|---|
| | Ex 1 | Ex 2 |
| Mass-load Fm | 12.2 kN | 340N |
| Max torque-load Ft | ±10.6 kN | ±5.0 kN |
| Max shock-load Fs | 36.0 kN | 1.7 kN |
| Total max compression load, not including pre-load Fp (where Ft is +ve) | 58.8 kN | 7.04 kN |
| Total max compression load, not including pre-load Fp (where Ft is −ve) | 37.6 kN | −2.96 kN |
| Pre-load Fp | 98.0 kN | 11.7 kN |

It can be seen from Table 3 that the total maximum compression load, not including pre-load Fp, for electrical machine Ex1 is dominated by the mass-load and is 60% of the relevant pre-load. Similarly, the total maximum compression load, not including pre-load Fp, for electrical machine Ex2 is dominated by torque-load and is 60% of the relevant pre-load.

The sandwich anti-vibration mount has a high compression stiffness characteristic Kc and can therefore cope with significant levels of compression loading. However, the sandwich anti-vibration mount has a low radial shear stiffness characteristic Krs. In practice, it is generally preferred that the radial shear stiffness characteristic Krs is substantially zero, or even negative, to minimise the forces that are transferred into the external support frame as a result of stator electromagnetic forces. This in turn minimises the amount of noise that is emitted by the external support frame. It is believed that while a conventional support structure using springs might be capable of achieving a 20-30 dB noise reduction over the frequency range 10 Hz to 2 kHz, the improved support structure of the present invention might achieve a 50-70 dB noise reduction over the same frequency range. It will be readily appreciated that this is close to an ideal mass-less spring characteristic.

Typical dynamic compression and radial shear stiffness characteristics Kc, Krs for the sandwich anti-vibration mount when installed in a support structure for the stator of electrical machines Ex1 and Ex2 would be:

TABLE 4

Typical stiffness characteristics for Ex 1 and Ex 2

|  | Ex 1 | Ex 2 |
| --- | --- | --- |
| Krs | 100 N/mm | 100 N/mm |
| Kc | 260 kN/mm | 55 kN/mm |
| Kc:Krs | 2600:1 | 550:1 |

A radial shear stiffness characteristic Krs can be described in relative terms with respect to the compression stiffness characteristic Kc as well as in absolute terms. Thus, for example, a radial shear stiffness characteristic Krs can be considered to be substantially zero if the stiffness ratio of Kc:Krs is greater than or equal to about 20:1. A radial shear stiffness characteristic Krs of 100 N/mm as shown above for Ex1 and Ex2 would therefore be considered to be substantially zero for practical purposes as long as the compression stiffness characteristic Kc for the same sandwich anti-vibration mount was at least 2 kN/mm.

As mentioned briefly above, the sandwich anti-vibration mount preferably consists of a plurality of elastomeric layers interleaved with rigid plates. The elastomeric layers may be made of any suitable material such as rubber, rubber mix or polymer, for example. Similarly, the rigid plates may be made of a suitable material, although a rigid plate metal such as steel will generally be preferred. The construction of the sandwich anti-vibration mount will normally be determined so that it has the required stiffness characteristics, and in particular the ability to achieve a radial shear stiffness characteristic Krs that is substantially zero, or even negative, for the reasons described above. If the radial shear stiffness characteristic Krs becomes zero, or even negative, then the stiffness ratio of Kc:Krs will become infinity and no allowance is made for a negative Krs. As mentioned above, the stiffness ratio is preferably greater than or equal to about 16:1 and will be satisfied for all possible values of Krs. Construction features of the sandwich anti-vibration mount that may be taken into account when determining the stiffness characteristics might include: the thickness, hardness and shape of the elastomeric layers, and in particular the shape of the edge profile; the thickness of the rigid plates; and the number of elastomeric layers and rigid plates. The sandwich anti-vibration mount can also be designed and constructed to ensure that its radial natural frequency is unlikely to be excited by the radial vibrations caused by stator electromagnetic forces. The vibration frequencies for the stator may be measured or predicted by computer modelling, for example, and will typically depend on the machine parameters such as the number of stator teeth, rotational speed etc. The natural frequency will preferably remain substantially constant when the sandwich anti-vibration mount is in use. In other words, the sandwich anti-vibration mount can have a constant periodicity where its natural frequency preferably remains substantially constant and is not altered or affected by the compression and/or radial loading experienced by the sandwich anti-vibration mount when the rotating electrical machine is operating.

The materials used to construct the sandwich anti-vibration mount will preferably be such that the mount can be exposed to elevated temperatures of about 100° C. This is considered to provide a further technical advantage because where conventional support structures use springs then these have to be located in low temperature regions.

The elastomeric layers and interleaved rigid plates can be located between rigid end support members. One of the end support members can be used to locate the sandwich anti-vibration mount to a part of the stator while the other end support member can be used to locate the sandwich anti-vibration mount to the external support frame. In this way, the stator is effectively decoupled from the external support frame and it is only indirectly connected to it by means of the sandwich anti-vibration mount. The rigid end support members can be mechanically secured to the stator and external support frame using any suitable fixing such as bolts, for example, or may simply be positioned in or against a suitably shaped and sized seating provided at the stator and external support frame, respectively. Relative movement between the end support members in the tangential direction is experienced by the sandwich anti-vibration mount as a compression load while relative movement between the end support members in the radial direction is experienced by the sandwich anti-vibration mount as a radial shear load. In the case of a co-located pair of sandwich anti-vibration mounts then a single rigid end support member can be provided and shared by both mounts. For example, each sandwich anti-vibration mount may have a rigid end support member that locates the associated mount to the external support frame and a shared rigid end support member, positioned between them, that locates the mounts to a part of the stator.

At least one additional sandwich anti-vibration mount can be secured between the external support frame and a part of the stator such that it experiences compression loading in an axial direction of the stator. In other words, the additional sandwich anti-vibration mount will restrain any axial deflection of the stator while still preferably achieving a low-stiffness suspension in the radial direction. The additional sandwich anti-vibration mount will normally be located such that its compression axis is aligned substantially with a longitudinal axis of the stator and its radial shear axis is aligned substantially with a radius of the stator, optionally with the geometric centre of the stator. Alternatively, axial deflection of the stator may be achieved for applications such as rail or marine propulsion by means of stops. These stops can be solid metallic structures, such as collision chocks found in marine applications, or sprung structures commonly found in rail applications to overcome shunting loads. Stops made of composite and/or polymer materials can also be used.

A plurality of additional sandwich anti-vibration mounts or stops can be provided at spaced locations around the stator circumference and can be used to restrain axial deflection of the stator in one or both axial directions.

The external support frame is preferably made of a suitable rigid material such as steel and can be entirely conventional apart from those parts to which the sandwich anti-vibration mount is secured.

BRIEF DESCRIPTION OF THE DRAWINGS

Exemplary embodiments of the invention will now be described, with reference to the accompany drawings, in which.

DETAILED DESCRIPTION OF THE PREFERRED EMBODIMENTS

Figure 1:
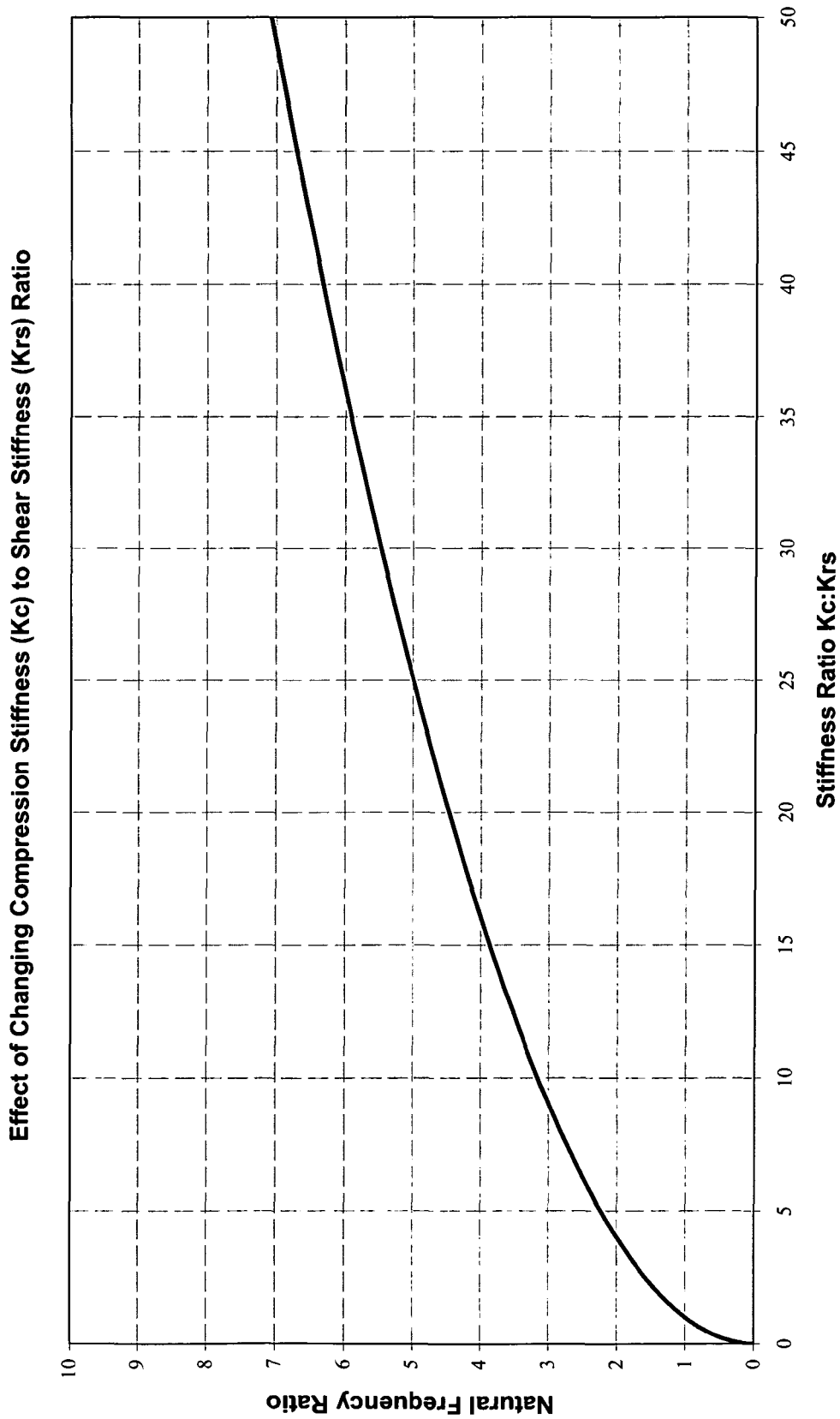
FIG. 1 is a graph showing how the natural frequency ratio of a sandwich anti-vibration mount varies with the stiffness ratio.
Figure 2A:
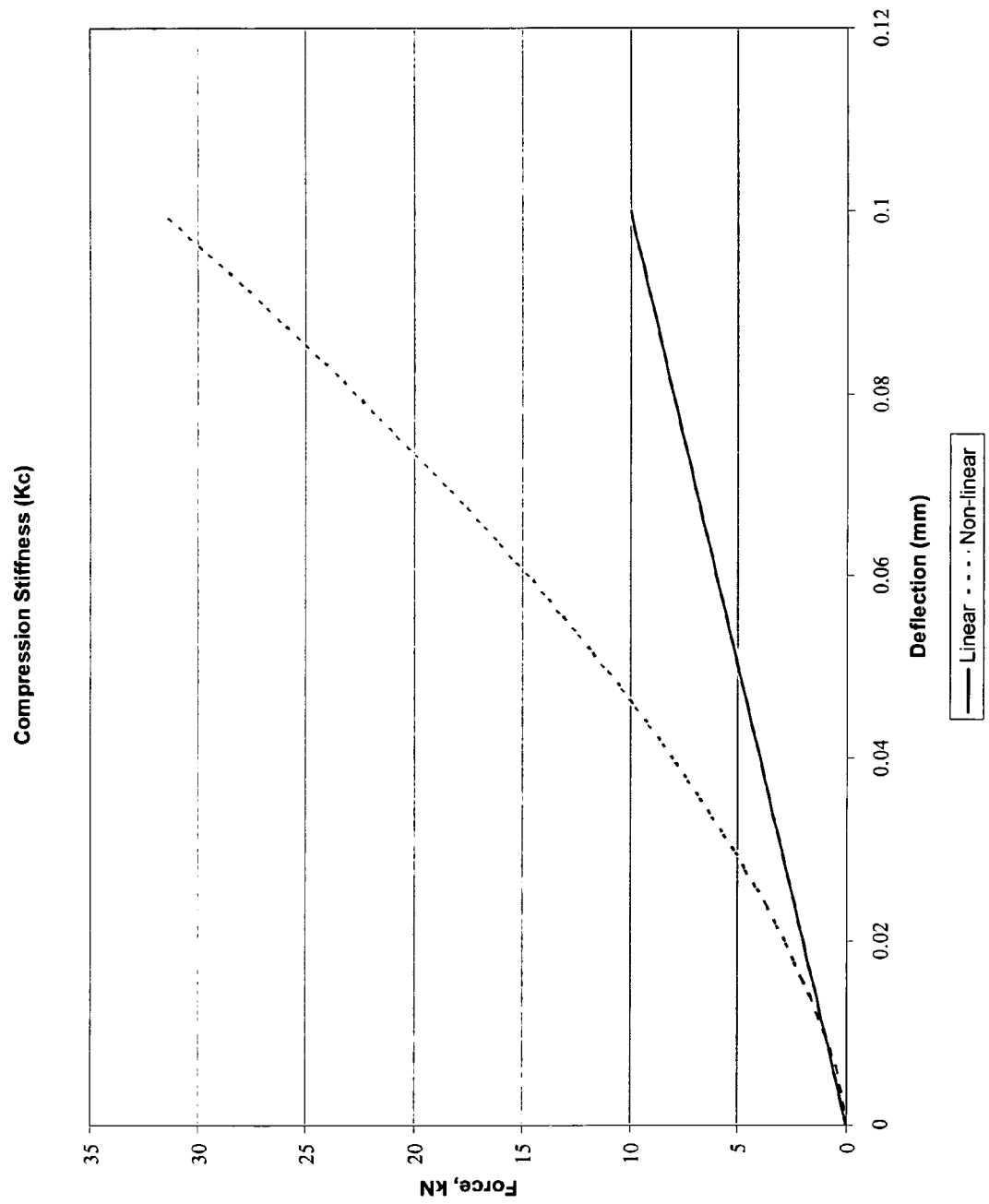
FIG. 2A is a graph showing a compression stiffness curve for a sandwich anti-vibration mount.
Figure 2B:
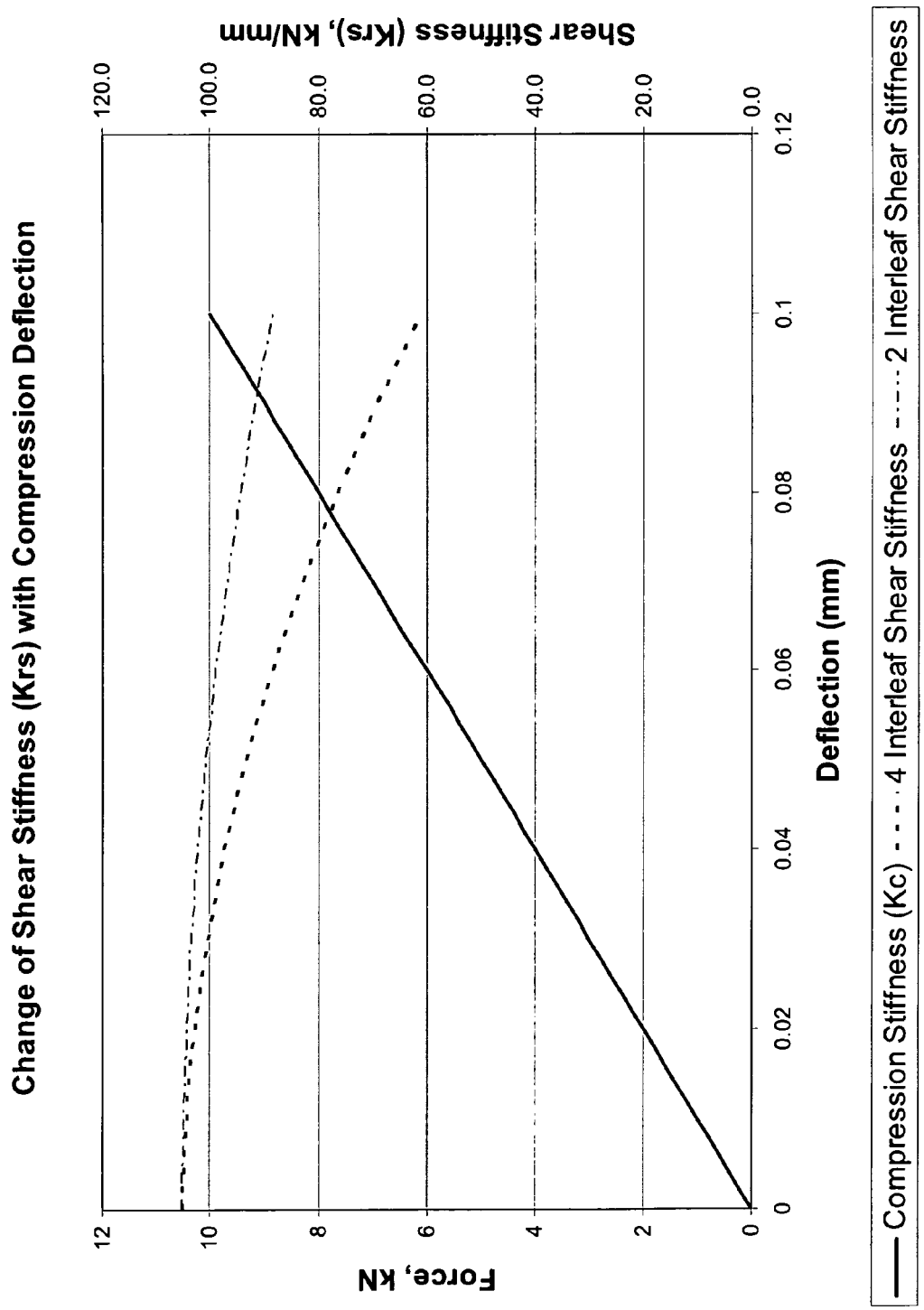
FIG. 2B is a graph showing how shear stiffness of a sandwich anti-vibration mount changes with compression deflection.
Figure 3:
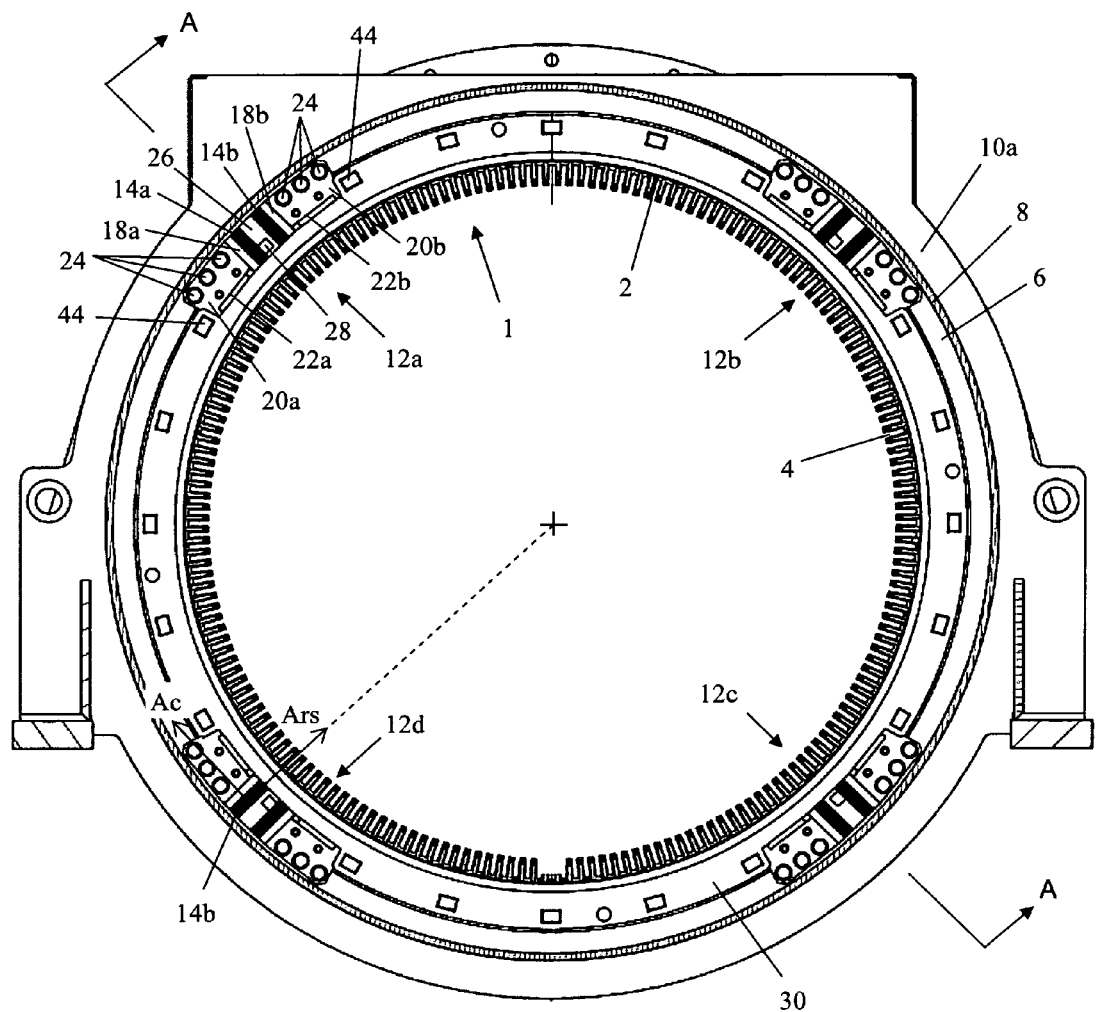
FIG. 3 is a radial cross-section view of a rotating electrical machine having a support structure according to the present invention.
Figure 4:
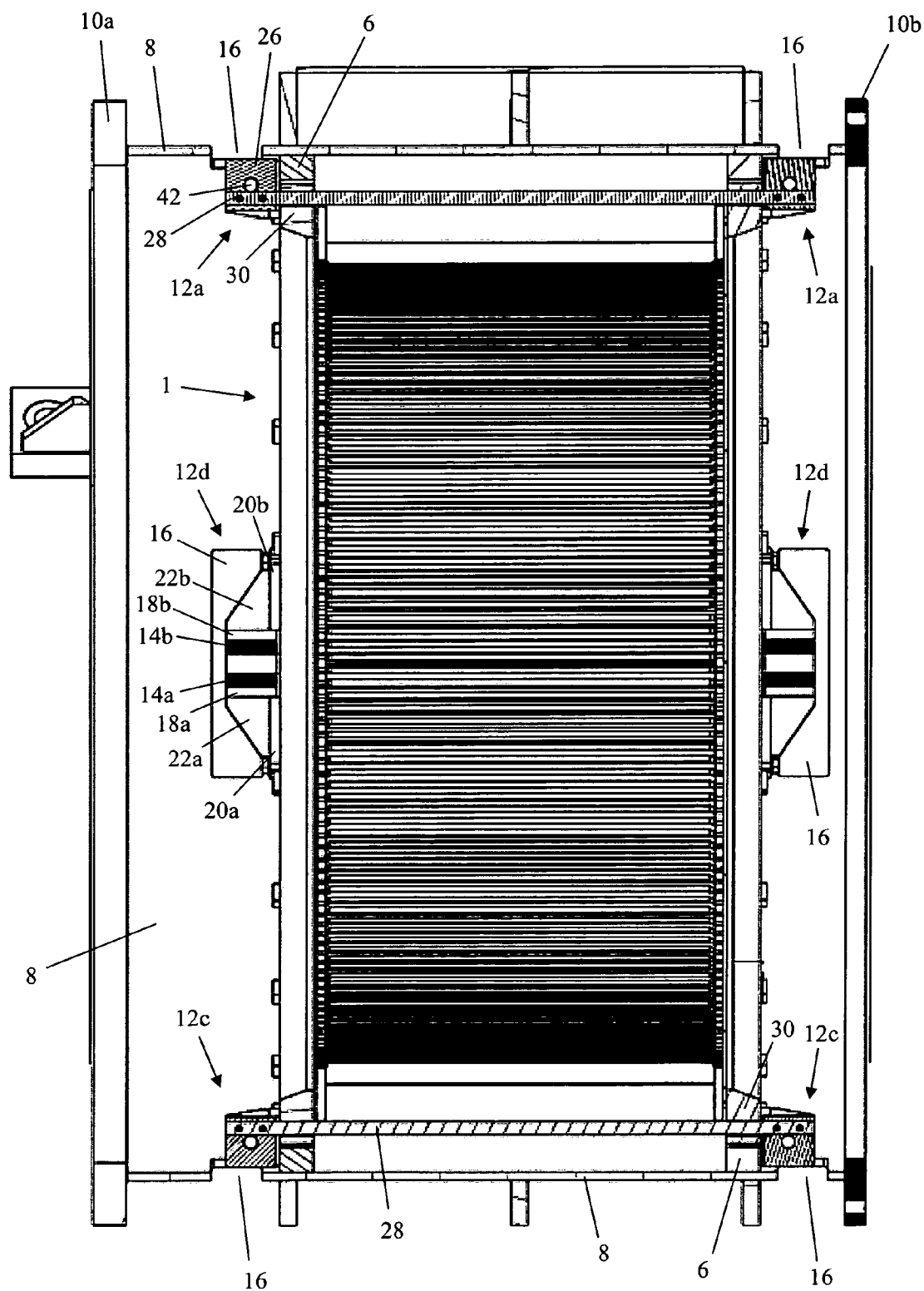
FIG. 4 is an axial cross-section view taken along line A-A of FIG. 3.

With regard to FIGS. 3 and 4 a stator assembly 1 for a rotating electrical machine (e.g. a motor or generator) includes a radially inner surface 2 that contains a plurality of circumferentially-spaced slots 4 for receiving the coils of a stator winding (not shown).

An external support frame is located outside the stator assembly 1. The support frame includes annular structural members 6, a cylindrical outer housing 8 and annular end plates 10a, 10b. Each axial end of the stator assembly 1 is indirectly connected to the annular structural members 6 of the external support frame at four separate mounting locations 12a-12d as shown in FIG. 3. The mounting locations 12a-12d are equally spaced around the circumference of the stator assembly 1. It will be readily appreciated that the number of mounting locations, their individual location and their angular spacing will depend on the construction of the stator assembly and/or the external support frame.

Each mounting location includes a pair of co-located mounts 14a, 14b. One mount in each pair experiences an increased compression load when a rotor (not shown) rotates within the stator assembly in a first direction and the other mount in each pair experiences an increased compression load when the rotor rotates in an opposite direction. In the arrangement shown in FIGS. 3 and 4 a total of sixteen sandwich anti-vibration mounts are used—eight at each axial end of the stator assembly 1. However, it will be readily appreciated that it is also possible for each mounting location to include two or more co-located mount pairs. In this case, the co-located mount pairs at each mounting location will normally be axially spaced apart. For example, co-located mount pairs can additionally be located at each of the four mounting locations at each axial end of the stator assembly 1 but axially inwardly of the annular structural members 6 of the support frame. Rectangular openings 16 are provided in the cylindrical housing 8 to allow access to, and visual inspection of, the mounts.

Figure 5:
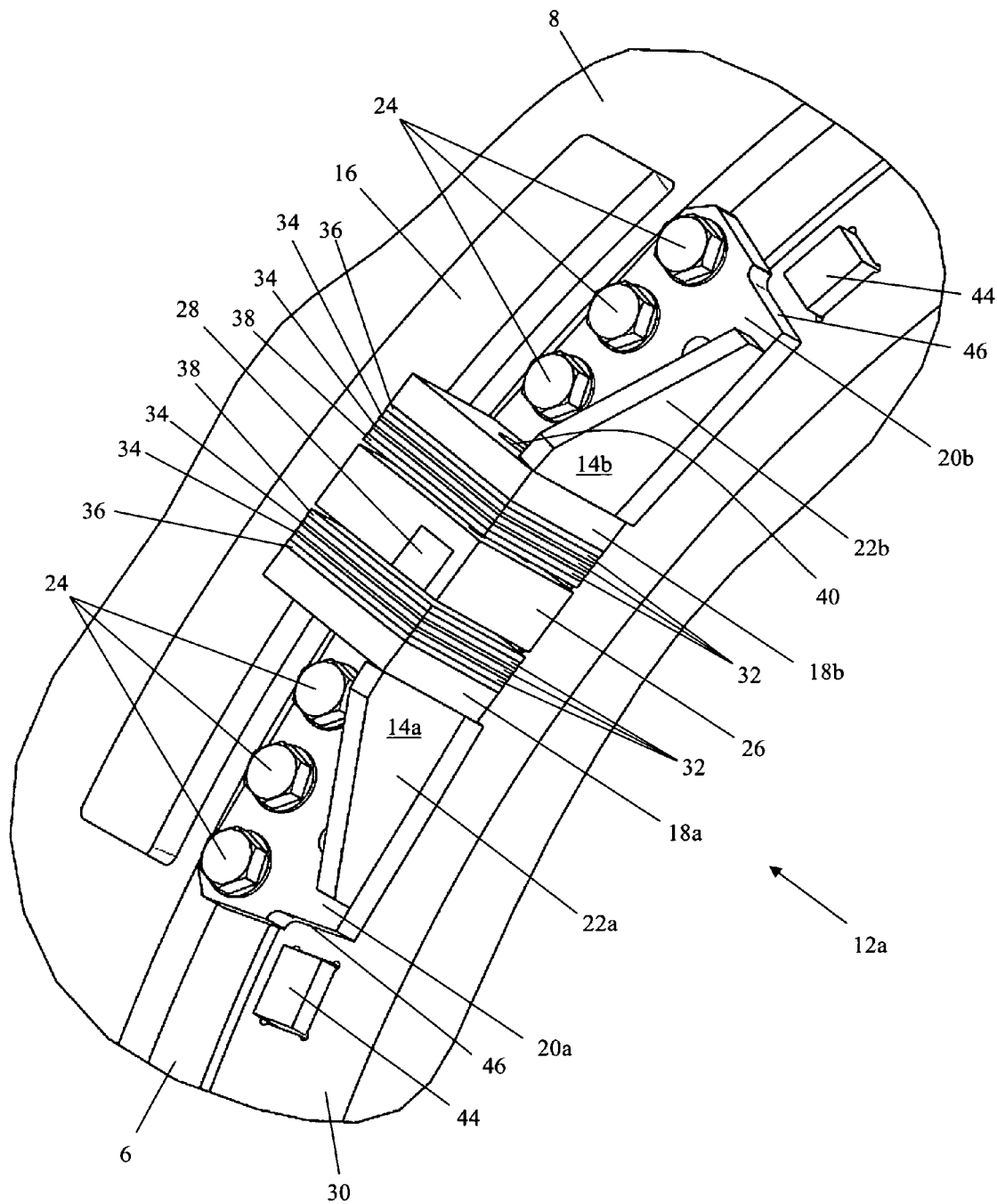
FIG. 5 is a detail perspective view of a pair of co-located sandwich anti-vibration mounts that form part of the support structure of the present invention.

One of the co-located mount pairs is shown in more detail in FIG. 5. A first sandwich anti-vibration mount 14a includes a rigid end support member that includes a reaction plate 18a, a mounting plate 20a and a support bracket 22a. Similarly, a second sandwich anti-vibration mount 14b includes a rigid end support member that includes a reaction plate 18b, a mounting plate 20b and a support bracket 22b. The mounting plates 20a, 20b include openings to enable the end support members to be mechanically secured to circumferentially-spaced parts of the annular structural member 6 by bolts 24. In the arrangement shown in FIGS. 3 to 5 each end support member is mechanically secured using three bolts. However, it will be readily appreciated that the number of bolts will depend on the size and fixing requirements of the mounts.

A rigid intermediate support member 26 is located between the first and second mounts 14a, 14b and is mechanically secured to one end of an axially-extending structural member 28 of the stator assembly 1 as shown in FIGS. 4 and 5. Since the arrangement shown in FIG. 3 has four mounting locations 12a-12d then there are four structural members 28 but only two are shown in FIG. 4. Each structural member 28 extends the full axial length of the stator assembly 1 and is supported at both ends by a co-located mount pair. The structural members 28 form an integral part of the overall stator assembly 1, and in particular with annular structural members 30 that are located radially inwardly of the annular structural members 6 of the support frame. As shown most clearly in FIGS. 4 and 5, the first and second mounts 14a, 14b overlap with the annular structural members 30 in the radial direction. A radial clearance is provided between the intermediate support member 26 and the external support frame to allow for a certain amount of relative movement. In practice, sufficient clearance must be provided between all parts of the stator assembly 1 and any rigid external structures.

The first and second mounts 14a, 14b have three elastomeric layers 32 interleaved with two intermediate rigid plates 34. A rigid end plate 36 of each mount is in direct non-fixed abutment with the adjacent reaction plate 18a, 18b of each end support member. The end plate 36 is held in position by the pre-load that is described in more detail below. A rigid end plate 38 of each mount is in non-fixed direct abutment with the intermediate support member 26 and is also held in position by the pre-load. Although not shown, the reaction plates 18a, 18b and the intermediate support member 26 may include shoulders or a suitable seating structure that will butt up to the edges of the rigid end-plates 36, 38 of each mount to provide location against shear loads.

It will be readily appreciated that there is no direct physical connection between the stator assembly 1 and the external support frame. More particularly, the indirect connection between the axially-extending structural members 28 of the stator assembly and the annular structural members 6 of the external support frame is made through the intermediate support member 26 and the end support members of the first and second mounts 14a, 14b at each mounting location 12a-12d.

Each mount is pre-loaded with a predetermined compression load. In the arrangement shown in FIG. 5, the same pre-load is applied mechanically to both co-located mounts 14a, 14b by a bolt (not shown) that passes through an opening 40 in the reaction plate 18a, 18b of each end support member. However, in a different arrangement each mount may be pre-loaded with its own predetermined compression load. The mounts may also be designed to accommodate different loads and have different stiffness characteristics. The bolt (not shown) passes through an opening 42 in the intermediate support member 26 that provides sufficient clearance to allow for relative movement between the stator assembly 1 and the external support frame.

Any relative movement between the stator assembly 1 and the external support frame in the radial direction is experienced by the co-located mounts 14a, 14b as radial shear loading along their radial shear axes and any relative movement between the stator assembly and the external support frame in the tangential direction is experienced by one of the co-located mounts as an increased compression load (i.e. a compression load that is greater than the steady-state compression load) and by the other mount as a reduced compression load that is less than the steady-state compression load. This will be described in more detail below.

Excessive relative movement between the stator assembly 1 and the external support frame in the tangential direction is prevented by stops 44 that are located on the annular structural members 30 of the external support frame on either side of the first and second mounts 14a, 14b at each mounting location 12a-12d. These stops 44 come into abutment with corresponding contact regions 46 provided on the circumferentially-outer edges of the mounting plates 20a, 20b.

The co-located mounts 14a, 14b each have a compression axis that is normal to the plane of the various elastomeric layers 32 and interleaved rigid plates 34 and a pair of orthogonal shear axes that are parallel to the plane of the various elastomeric layers and interleaved rigid plates. Each mount 14a, 14b is arranged such that its compression axis is aligned with a tangent of the stator assembly 1.

A radial shear axis of each mount 14a, 14b is aligned with a radius of the stator assembly 1 and points towards the geometrical centre of the stator. An axial shear axis of each mount 14a, 14b is aligned with the longitudinal axis of the stator assembly.

For illustration purposes, the compression axis Ac and radial shear axis Ars are shown in FIG. 3 for the mount 14b at mounting location 12d. The axial shear axis is not shown but extends out of the plane of the paper.

The pre-load Fp is applied mechanically to each mount 14a, 14b directly along its compression axis by the bolt (not shown) that passes through the opening 40 in the reaction plate 18a, 18b of each end support member.

A component of the mass-load Fm is applied to each mount 14a, 14b along its compression axis.

The combination of the pre-load Fp and the mass-load Fm represents the static compression load that is applied to each mount 14a, 14b when the support frame is stationary and the electrical machine is not operating.

When the rotor (not shown) rotates in an anti-clockwise direction then a torque acts along a tangent of the stator assembly 1. This results in a torque-load Ft being applied to the first mount 14a directly along its compression axis. The first mount 14a therefore experiences an increased compression load or in other words a compression load that is greater than the steady-state compression load. However, the second mount 14b of the co-located pair experiences a compression load that is less than the steady-state compression load. If the rotor (not shown) rotates in a clockwise direction (e.g. to provide reverse propulsion) then the second mount 14b experiences an increased compression load and the first mount 14a of the co-located pair experiences a compression load that is less than the steady-state compression load.

The support frame and stator assembly may experience a shock in any direction. Where appropriate a component of the shock-load Fs will be applied to each mount 14a, 14b along its compression axis and/or along one or both of the shear axes.

The mounts 14a, 14b have a high stiffness compression stiffness characteristic Kc and are therefore capable of restraining relative movement between the stator assembly 1 and the support frame in the tangential direction that may arise from the application of both static and dynamic compression loads.

The mounts 14a, 14b have a very low radial shear stiffness characteristic Krs (e.g. close to zero or even negative) and therefore provide a low-stiffness suspension in the radial direction. This in turn minimises the forces that are transferred from the stator assembly 1 into the support frame as a result of stator electromagnetic forces and provides an improved support structure that is exceptionally quiet, making it particularly suitable for naval vessels and research vessels, for example.

What is claimed is:

1. A support structure for the stator of a rotating electrical machine comprising:
    an external support frame located outside of the stator and comprising annular structural members, a cylindrical outer housing and annular end plates, wherein each axial end of the stator is indirectly connected to the annular structural members at separate mounting locations equally spaced around a circumference of the stator;
    at least one pair of sandwich anti-vibration mounts disposed at each mounting location axially inward of the annular structural members, and each including a plurality of layers sandwiched together wherein the plurality of layers includes elastomeric layers interleaved with rigid plates, the at least one pair is located between the external support frame and a part of the stator such that the at least one sandwich anti-vibration mount experiences compression loading in a substantially tangential direction of the stator and radial shear loading in a substantially radial direction of the stator during operation of the rotating electrical machine, wherein the compression loading applied during the operation of the rotating electric machine includes a combination of static compression loads and dynamic compression loads and the sandwich anti-vibration mount having a compression axis, wherein one sandwich anti-vibration mount of the at least one pair experiences a torque-load when a rotor of the rotating electric machine rotates in one direction and the other sandwich anti-vibration mount of the at least one pair experiences a torque-load when the rotor of the rotating electric machine rotates in the opposite direction, and wherein the layers are further compressed when the compression load applied is greater than the static compression loads, and uncompressed when the compression load applied is less than the static compression loads such that the elastomeric layers in one sandwich anti-vibration mount of the at least one pair are compressed while the elastomeric layers in the other sandwich anti-vibration mount of the at least one pair are uncompressed;

wherein each sandwich anti-vibration mount has a stiffness characteristic for compression loading Kc and a stiffness characteristic for radial shear loading Krs; and wherein each sandwich anti-vibration mount is pre-loaded with a predetermined compression load including a static compression load applied substantially along the sandwich anti-vibration mount's compression axis.

2. The support structure of claim 1, wherein the elastomeric layers and interleaved rigid plates are located between rigid end support members.

3. The support structure of claim 2, wherein the support structure further comprises an intermediate support member adjacent to the at least one sandwich anti-vibration mount and is mechanically secured to the part of the stator and each rigid end support member is mechanically secured to the external support frame.

4. The support structure of claims 1, wherein a shear axis of each sandwich anti-vibration mount is substantially parallel to the plane of the various elastomeric layers and interleaved rigid plates.

5. The support structure of claim 1, wherein a shear axis of each sandwich anti-vibration mount is aligned substantially with a radius of the stator.

6. The support structure of claim 1, wherein the stator is indirectly connected to the external support frame by at least one sandwich anti-vibration mount at a mounting location.

7. The support structure of claim 1, wherein the stator is indirectly connected to the external support frame by at least one sandwich anti-vibration mount at one of a plurality of spaced mounting locations around the stator circumference.

8. The support structure of claim 6, wherein each mounting location includes the at least one pair of sandwich anti-vibration mounts.

9. The support structure of claim 1, further comprising at least one additional sandwich anti-vibration mount secured between the external support frame and a part of the stator such that the at least one additional sandwich anti-vibration mount experiences compression loading in an axial direction of the stator.

10. The support structure of claim 9, wherein a shear axis of each sandwich anti-vibration mount is aligned substantially with a radius of the stator.

11. The support structure of claim 1, further comprising a stop for preventing axial deflection of the stator relative to the external support frame.

12. The support structure of claim 1, wherein a shear axis of each sandwich anti-vibration mount is aligned substantially with the geometric center of the stator.

13. The support structure of claim 9, wherein a shear axis of each sandwich anti-vibration mount is aligned substantially with the geometric center of the stator.

14. A support structure for the stator of a rotating electrical machine comprising:

an external support frame located outside of the stator and comprising annular structural members, a cylindrical outer housing and annular end plates, wherein each axial end of the stator is indirectly connected to the annular structural members at separate mounting locations equally spaced around a circumference of the stator; and at least one pair of anti-vibration mounts disposed at each mounting location axially inward of the annular structural members, and each comprising a plurality of layers sandwiched together wherein the plurality of layers includes elastomeric layers interleaved with rigid plates, and a compression axis and a shear axis, the at least one anti-vibration mount being located between the external support frame and a part of the stator, wherein a compression loading applied to the at least one anti-vibration mount during operation of the rotating electrical machine is a combination of static compression loads and dynamic compression loads, wherein one sandwich anti-vibration mount of the at least one pair experiences a torque-load when a rotor of the rotating electric machine rotates in one direction and the other sandwich anti-vibration mount of the at least one pair experiences a torque-load when the rotor of the rotating electric machine rotates in the opposite direction, and wherein the layers are further compressed when the compression load applied is greater than the static compression loads, and uncompressed when the compression load applied is less than the static compression loads such that the elastomeric layers in one sandwich anti-vibration mount of the at least one pair are compressed while the elastomeric layers in the other sandwich anti-vibration mount of the at least one pair are uncompressed;

wherein the compression axis is aligned with a tangent of the stator and the shear axis is aligned with a radius of the stator, and the compression axis is pre-loaded with a predetermined compression load including a static compression load, and a stiffness characteristic for compression loading is greater than a stiffness characteristic for shear loading.

* * * * *